(12) United States Patent
deCarmo

(10) Patent No.: US 6,260,143 B1
(45) Date of Patent: Jul. 10, 2001

(54) HOST-BASED CACHING METHOD AND SYSTEM FOR COPY PROTECTED CONTENT

(75) Inventor: Linden A. deCarmo, Plantation, FL (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/122,967

(22) Filed: Jul. 27, 1998

(51) Int. Cl.[7] ................................................. G06F 11/30
(52) U.S. Cl. ........................... 713/165; 713/167; 380/275; 380/287
(58) Field of Search ............................... 380/275, 42, 287, 380/FOR 109, FOR 119; 713/165, 167, 193, 194, 200

(56) References Cited

U.S. PATENT DOCUMENTS

| | | | |
|---|---|---|---|
| 5,787,461 | * | 7/1998 | Stephens ............................ 711/113 |
| 5,946,708 | * | 8/1999 | Fang et al. ......................... 711/113 |
| 6,065,006 | * | 5/2000 | deCarmo et al. ....................... 707/7 |

* cited by examiner

Primary Examiner—Thomas R. Peeso
(74) Attorney, Agent, or Firm—Kudirka & Jobse, LLP

(57) ABSTRACT

A method and system of read-ahead caching for use in a DVD player utilizing CSS titles is disclosed. The caching system is a host-based read-ahead caching system that utilizes a threaded architecture for caching. One thread is dedicated to retrieving data from the cache and a second thread is dedicated to reading data from the cache. The producer thread is intelligent enough to cache only within a title boundary, thus preventing costly re-authentication steps.

18 Claims, 8 Drawing Sheets

HOST-BASED CACHING METHOD AND SYSTEM FOR COPY PROTECTED CONTENT

FIELD OF THE INVENTION

This invention relates generally to improvements in digital versatile disc systems and, more particularly, to improved memory management therefor. More particularly still, the present invention relates to a memory caching system for use in a DVD system having copy protected content.

BACKGROUND OF THE INVENTION

Digital versatile discs (DVDs) are information storage devices used for storing prerecorded audio information, movies and computer software. The storage mechanism used in DVDs closely resembles that used in compact discs (CDs). DVD players also use the same laser technology as CD players. Briefly, both DVDs and CDs store information as a pattern of pits formed in a metallic substrate. The pit patterns form digital words and can be read by shining a laser beam on the disc surface and detecting the reflected beam. The information storage capacity of a typical DVD, however, is much higher than a CD. Presently available DVDs have a variety of capacities which depend on the technology used to manufacture the discs. Single-layer technologies can be either single or double-sided with capacities of 4.7 gigabytes and 9.4 gigabytes, respectively. Dual layer technologies will soon be available which use single or double sided capacities that hold approximately 8.5 gigabytes per side. This high information storage capacity makes DVDs suitable for storing not only audio information, but also video information and large amounts of computer data as well.

DVD players have many CD player features, such as the ability to play selections in any order desired and the ability to read information from any point on the disc. However, DVDs can store information in several formats. For example, DVDs which are used to store video information, hereinafter called DVD-VIDEO discs, may use various known information compression algorithms, such as MPEG-2 for video compression/decompression. A DVD may also include high fidelity sound as well. In addition, a DVD may also store uncompressed linear pulse code modulated data streams which have sample rates between 48–96 kHz and are sampled at 16 or 24 bits. Still other DVD versions, hereinafter called DVD-ROM discs, can store digital data for computer use, and the data may also be compressed on these discs.

Although DVD-ROM and DVD-VIDEO discs share compression algorithms, the data format on DVD-VIDEO discs is significantly different than the data format found on DVD-ROM discs. One important difference is that the data content on DVD-ROM is platform-specific, while DVD-VIDEO discs operate with a platform independent navigation engine for playing interactive movies. This navigation engine requires that the files on the DVD-VIDEO disc be referenced in a predetermined directory structure.

The specific navigational commands which are recognized by a DVD player are controlled by a device independent language and a set of DVD player parameters which define the current state of the DVD player. The DVD command set, including the aforementioned commands and their definitions, are published in the DVD specification. A copy of the *DVD 1.0 Specification for Read-Only Disc* Vol. 3, including a more detailed description of all DVD commands, may be obtained, for example, from Toshiba Corp., 1-1 Shibaura 1-Chome, Minato-ku, Tokyo 105-01 Japan.

DVD systems require the ability to transfer large amounts of data from the disc to the playback system. Occasionally, interrupts occur that halt the transfer of data from the disc to the system. These interrupts typically are brief and can be provided for by using memory caching techniques. Memory caching is well know in the computer arts as well in the DVD standard. Memory caching is the technique of reading and retrieving data prior to the time it needs to be used and storing it in very fast memory that is more readily available over the original storage site. This pre-read material is pulled in advance from the DVD disc. Recently, however, an encryption technique has been added that prevents the copying of content on a DVD system.

There are several types of caching systems available. Unfortunately, none works with data that encrypted using the Content Scrambling System (CSS) that is utilized in the DVD Specification. All these caching systems perform read ahead operations in order to minimize the time required to retrieve data for the medium. Each title on a DVD-ROM disc requires the DVD-ROM drive to perform authentication steps, or obtaining a title key, before a sector(s) may be read from the disc. Since the caching system has no knowledge of these title keys, and since consecutive sectors may cross title boundaries, conventional caching techniques cannot be utilized as they fail upon the attempt to read across sectors over multiple titles.

Media-based caching systems using microcode on a DVD-ROM drive system do not have the same problems of reading over titles since they have access to the title key or are allowed to read over titles regardless of the title key. Unfortunately, these caching systems have expensive, non-expandable cache memory, which limits their use in DVD applications that require large cache memory.

Accordingly, what is needed is a caching system and method that overcomes the prior art problem of reading over multiple titles that are copy protected in order to cache them, which attempt results in a system failure.

SUMMARY OF THE INVENTION

According to the present invention, a method and system of read-ahead caching for use in a DVD player utilizing CSS titles is disclosed. The caching system is a host-based read-ahead caching system that utilizes a threaded architecture for caching. One thread is dedicated to retrieving data from the cache and a second thread is dedicated to reading data from the cache. The producer thread is intelligent enough to cache only within a title boundary, thus preventing costly re-authentication steps.

The digital versatile disc system is capable of reading copy protected data from a source. A cache memory store is provided that is coupled to a DVD reader. The DVD reader is used to read a data stream generated by the DVD apparatus. The data stream comprises selected information from a DVD source, such as a multimedia disc. Coupled to the cache memory is a producer thread that is used to read the DVD copy protected content and cache it during the reading of the data stream. The producer thread is intelligent in such a way as to read only within a title to find that is parsed from the data stream read. A consumer thread is provided that is coupled to the cache memory and the producer thread. The consumer thread retrieves the cached contents stored in the cache memory once the cache memory is ready to download. The copy-protected data typically is encoded in Content Scrambling System (CSS) encoding, which is used in DVD media. A salvage thread is also provided that is coupled to the consumer thread in the cache memory. The salvage thread defines the position for data retrieval of the cached data upon notice of a cache read. The title is selected from multiple titles selected on the DVD media and each title typically includes a plurality of sectors storing the data for the particular title. Upon selection of a title, the producer thread parses the data stream to define the title from a start position to an end position and then the producer thread authorizes caching of data only within the boundaries defined by the start and end position.

A method for caching the title read in a data stream from a DVD is also disclosed. The data stream is likewise in copy protected content. One step in the method includes parsing the data stream for the content information. The next step selects a portion of the parsed data stream based on a portion of the content information. A portion of the parsed data stream includes title information and the title subject matter to be played by the DVD player. The next step, upon authorization, is the caching of the title. Additionally, the data stored in the cache is read out at a later time. A computer program product is also disclosed and is useful for modifying a computer system to perform the method as described above.

BRIEF DESCRIPTION OF THE DRAWINGS

The above and other features, objects and advantages of the invention will be better understood by referring to the following detailed description in conjunction with the accompanying drawing in which.

DETAILED DESCRIPTION

Figure 1:
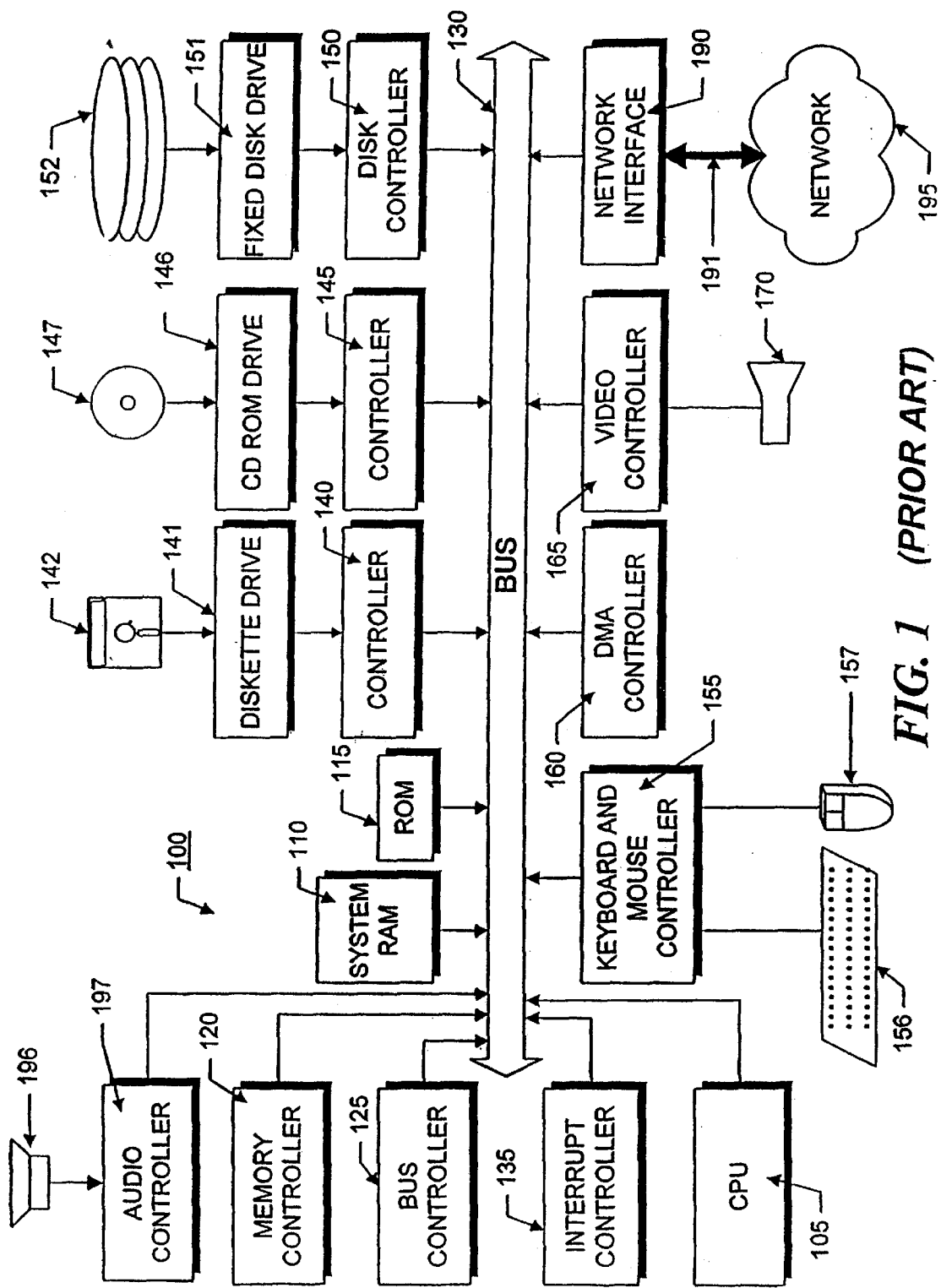
FIG. 1 is a block diagram of a computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RMA 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 can be inserted into diskette drive 141 which is, in turn, connected to bus 30 by a controller 140. Similarly, CD ROM 147 can be inserted into CD ROM drive 146 which is, in turn, connected to bus 130 by controller 145. Hard disk 152 is part of a fixed disk drive 151, which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Boca Raton, Fla. The operating system controls allocation of system resources and performs tasks such as processing scheduling, memory management, networking, and I/O services, among things. In particular, an operating system 20 resident in system memory and running on CPU 105 coordinates the operation of the other elements of computer system 100. The present invention may be implemented with any number of commercially available operating systems including OS/2, UNIX and DOS, etc. One or more applications 202 such as Lotus Notes, commercially available from Lotus Development Corp., Cambridge, Mass. If operating system 200 is a true multitasking operating system, such as OS/2, multiple applications may execute simultaneously.

Figure 2:
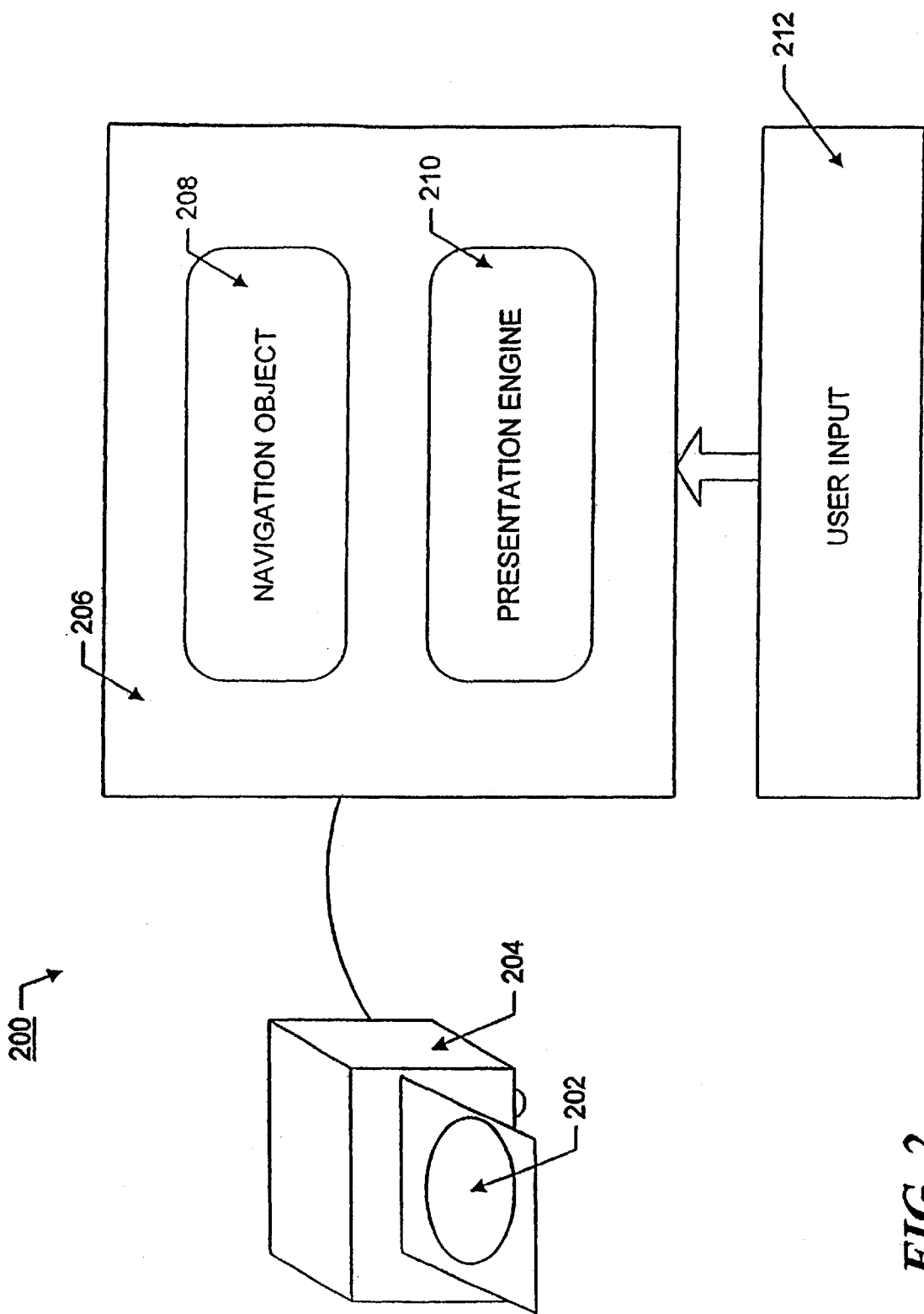
FIG. 2 is a conceptual diagram of the elements comprising an Interactive DVD Browser suitable for use with the present invention.

FIG. 2 illustrates conceptually the user interface system in accordance with the present invention. In a preferred embodiment, the elements of interface system are implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise objects are destroyed by a special function called a destructor. Objects may be used by using their data and invoking their functions. When an object is created at runtime memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Object-oriented technology forms the basis for component technology. For the purpose of this disclosure, components are essentially C++ objects that conform an object model, such as Microsoft's Component Object Module. An object module is a unifying set of rules that describe object structure, object life cycle, and inter-object communication. Object structure relates to the physical layout of objects in memory, while object life cycle refers to how applications create and destroy objects. Inter-object communication refers to protocols by which objects communicate with one another. Object modules are useful in contexts where all objects in a given system need to conform to a given protocol governing these parameters. Most object-oriented and object-based languages, including C++, do not specify true object modules, but merely specify syntax and semantics of a basic object implementation without specifying the rules that unify object systems.

FIG. 2 illustrates conceptually the main components of a system 200 in accordance with the present invention. FIG. 2 shows a DVD-ROM drive 204 connected to a computer 206. Use of the DVD-ROM drive 204 with the computer 206 should not be construed as a limitation of the invention, however, since other DVD source mechanisms such as the internet, digital satellite dishes, etc., may be substituted for the DVD-ROM drive 204. In addition, the DVD-ROM drive 204 may also be a drive suitable for internal mounting in computer 206.

The DVD drive 204 receives a disc 202 containing compressed and encoded information which has been coded in accordance with the DVD 1.0 Specification for Read-Only Disc and disc 202 may contain up to seventeen gigabytes of information. The computer 206 includes a driver, not shown, for enabling the operating system in the computer 206 to control and exchange information with the drive 204. Computer 206 also includes one or more input devices 212 which receive input from a user.

The computer 206 also includes a control and playback program shown schematically in FIG. 2 as having a navigation object 208 with logic for reading data from the drive. A presentation engine 210 includes decompressing and decoding routines for decoding the information on the disc 202 and routines for formatting the information for display. For example, the audio information may be compressed by means of conventional compression technique known as Dolby® AC-3® compression, also known as "Dolby® Digital" decompression. Video information may be compressed using a compression technique known as Moving Picture Experts Group-2 (MPEG-s). The computer 206 also includes an optimizer 214 and a storage unit 216. The storage unit 216 operates as a cache and may take the form of system RAM 110.

Figure 3:
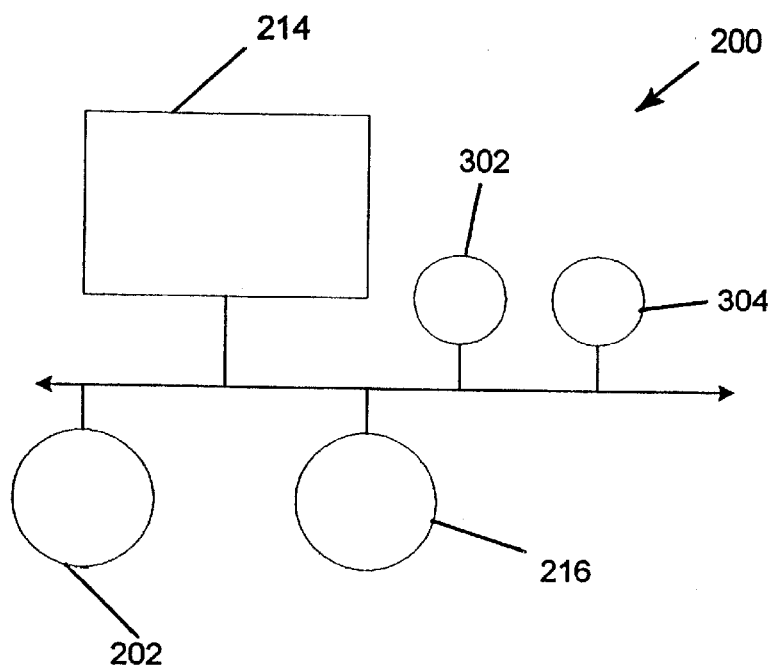
FIG. 3 is a schematic diagram representing the DVD player with selected semaphores that are implemented in order to perform caching of CSS content.

The DVD player 214 interacts with the storage unit 216. In this embodiment, storage unit 216 serves as cache memory. This is illustrated in FIG. 3. The system 200 utilizes a producer thread 302 that interacts with the DVD drive 214, the cache memory 216 and a consumer thread 304. Producer thread 302 retrieves data from the cache while the consumer thread 304 reads data from the cache memory 216. The concept of threads as well as the use of semaphores, is further described in commonly assigned U.S. patent application Ser. No. 09/014,480 entitled DVD NAVIGATION SYSTEM WITH MULTIPLE INDEPENDENT THREADS herein incorporated by reference for all purposes.

Figure 4:
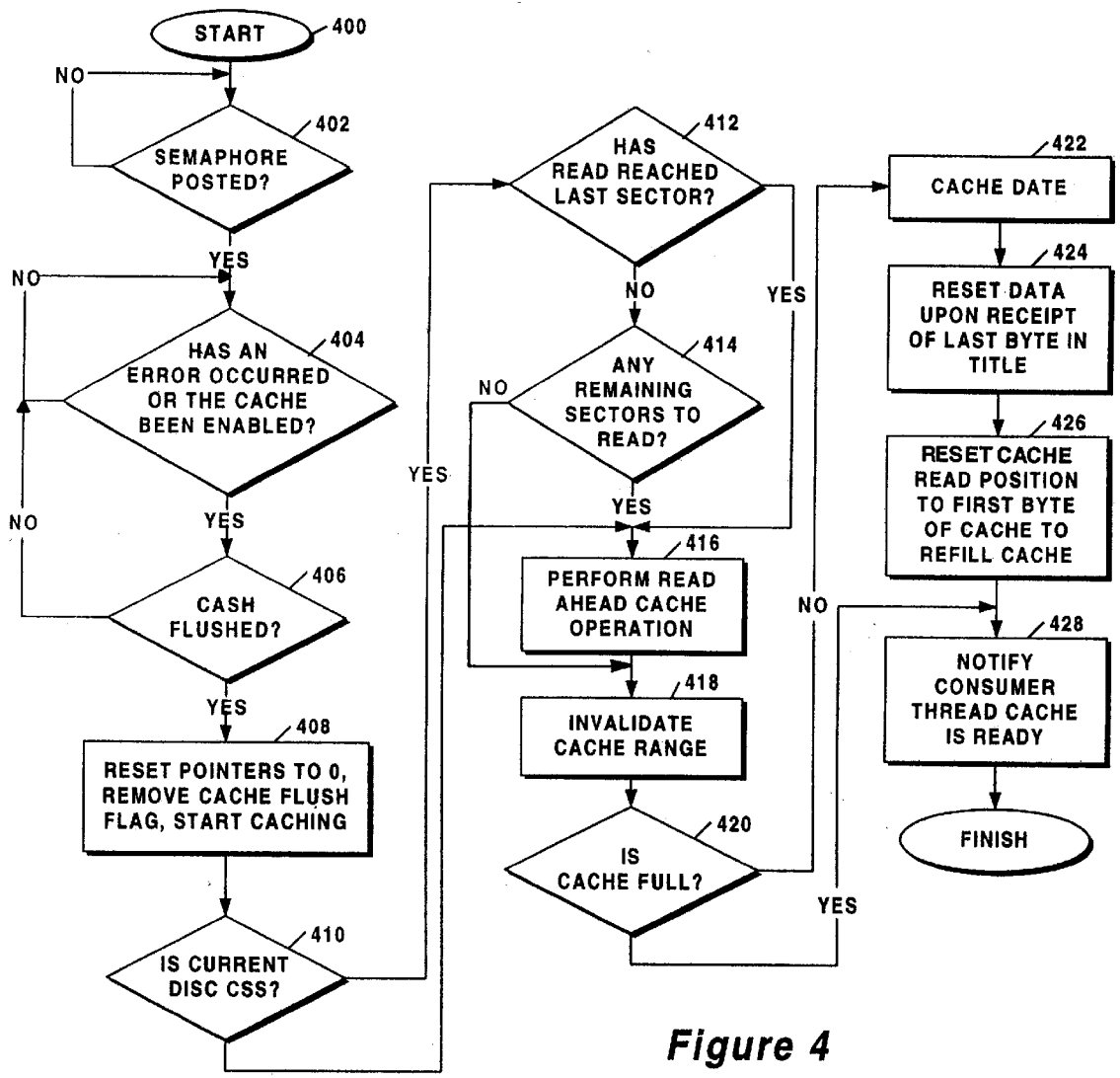
FIG. 4 is a block diagram depicting the operation of the producer thread according to FIG. 3.
Figure 6:
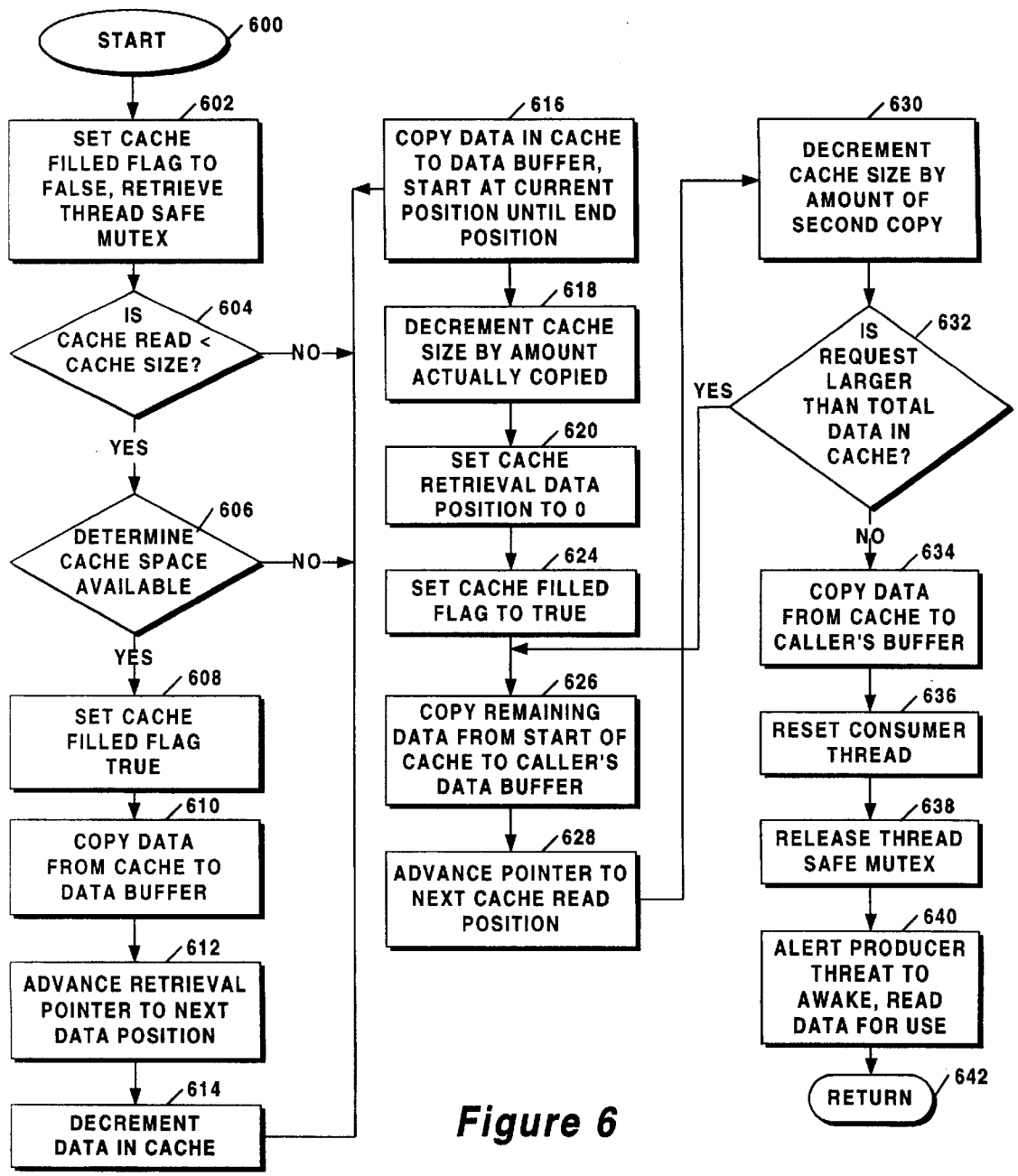
FIG. 6 illustrates a flowchart of the consumer thread of FIG. 3.

FIG. 4 depicts a flow diagram of the operation of Producer threat 302. The system begins in step 400 and then in step 402, the system waits until a Producer semaphore is posted. In step 404, the system determines if any errors have occurred and if caching has been enabled. If no errors have occurred and the caching has been enabled, the system proceeds to step 406. In step 408, the system determines if the cache has been flushed and if so, in step 408, the system resets all internal pointers to 0, removes the cache flush flag, and starts caching from the current sector.

Proceeding to step 410, the system determines if the disc being played is Content Scrambling System (CSS) encoded; if so, the system proceeds to step 412, otherwise, the system proceeds to step 416. Next, in step 412, the system determines whether the next cache read ahead will proceed past the last valid sector in the particular title being played. If the system proceeds past the last valid sector, the system, in step 414 determines if there are any sectors remaining in the title yet to be read. If there are sectors remaining, the system proceeds to step 416 where the system performs a read ahead caching operation within the remaining sectors. Otherwise, if there are no more sectors remaining, the system deactivates the cache read operation and invalidates the caching range from this point in step 418. As long as caching is valid, the system retrieves and caches data, even if the reads are across non-contiguous sectors in the same title.

Continuing during a valid read operation, in step 420, the system determines if the cache has room for additional storage and if so, in step 422, the system continues to retrieve and cache the data. When the system reaches the last byte position in the cache in step 424, the system, in step 426, resets the cache read position to the first byte and proceeds back to step 416 to refill the cache read ahead function for the specified amount of data. Then, the system, in step 428, sends a wake up call to the consumer thread, which is waiting on the data stored in the cache.

Figure 5:
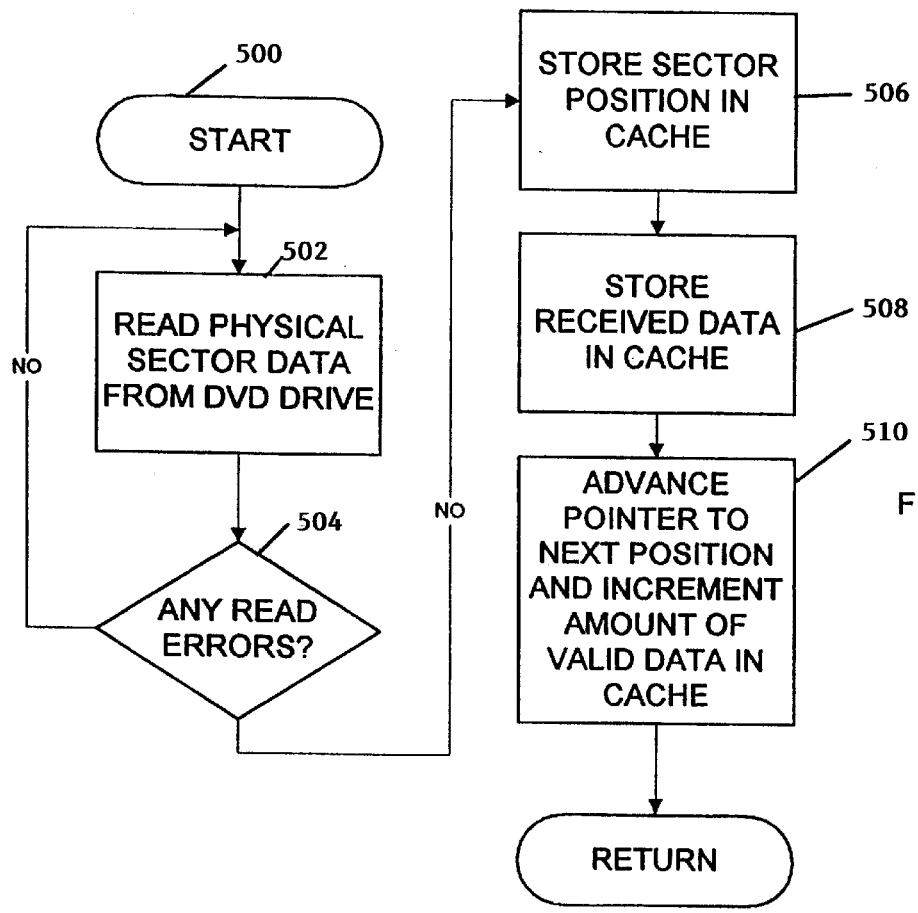
FIG. 5 depicts a block diagram of the read ahead thread according to FIG. 3.

The ReadAhead operation performs as follows and as illustrated in FIG. 5. In step 500, the system begins and then proceeds to step 502 to read the physical sector data from the DVD ROM drive. If there are no errors, as determined in step 504, the system, in step 506 stores the sector position in the cache. Next, in step 508 the system stores the amount of data just retrieved. In step 510, the system advances the pointer to the next position to read and then increments the total amount of valid data in the cache.

In an illustrative embodiment, the software elements of system 200 may be implemented using object-oriented programming techniques. As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

A representative pseudocode example of the Producer thread is given as follows:

```
CacheThread();
Loop forever
{
  Sleep until producer semaphore is posted if (caching thread is being terminated)
  {
    exit while loop
  }
  Get thread-safe mutual exclusive semaphore if (there have been no errors and caching is enabled)
  {
      Set fCheckCache BOOLEAN to TRUE;
      if (cache has been flushed)
      {
        reset all internal pointers to 0
        remove cache flush flag
        start caching from the current sector
      }
  if (this disc is a CSS disc)
  {
  if (the next cache read ahead willput us beyond the last valid sector in the title)
  {
    if (there are still are sectors in this title left to read)
    {
      PerformReadAhead caching with the remaining sectors
    }
    else
    {
      Set flags turning off caching and that the cache range is valid
    }
    Set cache check BOOLEAN to FALSE;
  }
  {
  As long as caching is valid, grab data
  {with non-copy protected data, the range will always be valid}
  }
    while (there is room in our cache to read a predefined cache amount)
    {
      if (we have reached the last byte position in the cache)
      {
        Set our cache read position to the first byte
      }
      Perform ReadAhead caching of the specified amount of data
    }
  }
}
Wakeup the consumer thread(s) who is waiting on data from the cache
Reset producer semaphore we will sleep on
Release thread-safe mutex semaphore
ReadAhead(unsigned long cachereadsize)
{
  Read Physical Sector Data from DVD ROM drive;
  if (there were no errors)
  {
    store the sector position in the cache
```

```
   Store the amount of data we just retrieved
   advance our pointer to next position to read
     increment the total amount of valid data in the cache
   }
 }
}
```

Once the caching has been performed, the data in the cache must be accessed for reading. This is known as the consuming function. The system starts in step 600 and proceeds to step 602 and sets the CacheFilled flag to False and acquires a threadsafe mutex (mutex stands for mutually exclusive and these semaphores are used to control access to resources by multiple threads) semaphore while the read request has yet to be filled. The system, in step 604, determines if the amount to read is less than the cache size. If there is enough cache left to fill the cache with data to the end of the cache from the current position, system proceeds to step 606; otherwise the system goes to step 616.

Step 606 determines the cache space available and if there is space available, the system proceeds to step 608 where the CacheFilled flag is set True, or a non-zero value. If not the system goes to step 610. Next, in step 610, data is copied from the cache to the data buffer, which also frees the code for additional caching. In step 612, the cache retrieval data pointer is advanced to the beginning of the next data position to be retrieved. Then, in step 614, the data in the cache is decremented.

If the cache doesn't have enough room, the system copies data from the current to ending position of the cache to the caller's data buffer in step 616. In step 618, the system decrements the cache size and the amount left to copy by the amount actually copied to the caller's data buffer. After completing step 620, the system stores the retrieval data position from the cache at position 0. Afterwards, the CacheFilled flag is set to True according to step 624. Next, in step 626, the system copies the remaining data from the start of the cache to the caller's data buffer and, in step 628, the system advances the pointer to the next cache read position. Next, the system decrements the cache size by the amount of the second copy per step 630.

If the user's request is larger than the total data in the cache per step 632, the system proceeds to step 626 to copy data into the caller's buffer from the current beginning location to the end of the cache to the caller's buffer. In step 638, the system decrements the amount of data left in the cache by the amount actually copied out. In step 630, the system determines if enough data is located at the head of the cache and, if so, returns to step 624; otherwise, the system returns to step 626.

In step 634, the system copies the remainder of the cache to the user's. In step 636, the system resets the Consumer Semaphore and releases the thread safe mutex in step 638. In step 640 the system notifies the producer to wake up and READ data for use before returning to a sleep mode 642 until the cache is again full.

Figure 7:
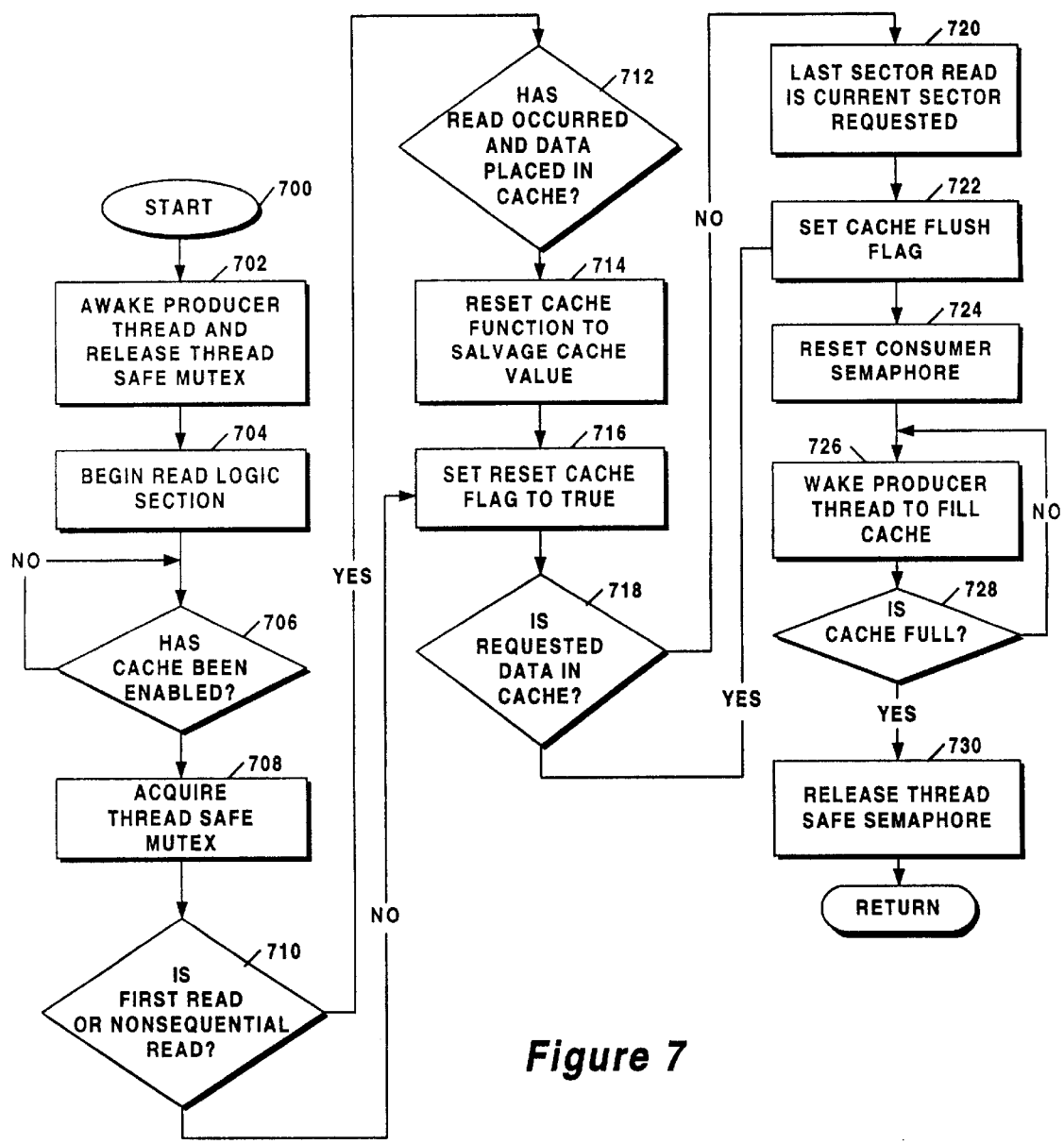
FIG. 7 illustrates the operation of performing read ahead process of the producer thread.

Proceeding to the flow diagram of FIG. 7, the system, in step 700 wakes up the producer thread to perform read ahead operations and releases the thread safe mutex. In step 702 the system begins the readlogical section function before proceeding to step 704. Step 706 determines whether caching has been enabled and if so, proceeds to step 708; otherwise, the system waits until cache is enabled. In step 708 the system acquires the threadsafe mutex semaphore. In step 710 the system determines whether the reading is the first read or is a nonsequential read. If it is non-sequential, the system proceeds to step 712 to determine if a read has occurred placing data in the cache and if the request has been read into the cache.

Figure 9:
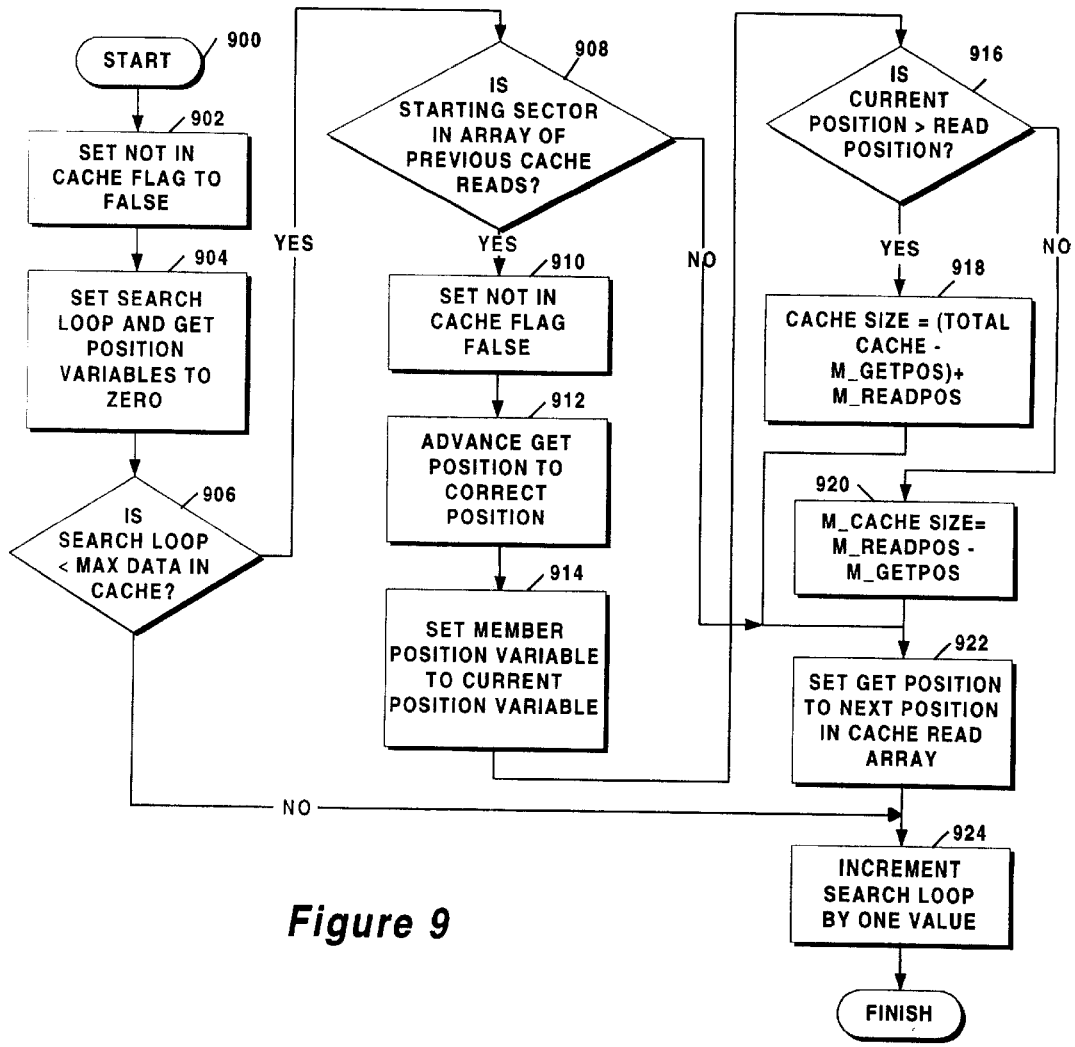
FIG. 9 illustrates a flow chart outlining the process of salvaging the cache according to the present invention.

In step 714, the system sets the reset cache function to the salvagecache value. The salvage cache value is defined by the sector number, the number of total sectors and the pointer to the read request buffer. The method of determining the salvage cache value is depicted in FIG. 9. If no reading has taken place, or the request is not found in the cache, the system, in step 716, sets the resetcache flag to True. The system then proceeds to step 718 to determine if the data cannot be found in the cache. If no data can be found, the system proceeds to step 720, otherwise the system proceeds to step 722.

In step 720 the system indicates that that last sector read is the currently requested sector. Next, in step 722 the system sets the cache flush flag and resets the consumer semaphore in step 724. Then, in step 726, the system releases the threadsafe semaphore before waking up the producer to fill the cache in step 728 and then entering a sleep mode until the cache is full. Once the cache read operation is completed, the system releases threadsafe semaphore in step 730.

Figure 8:
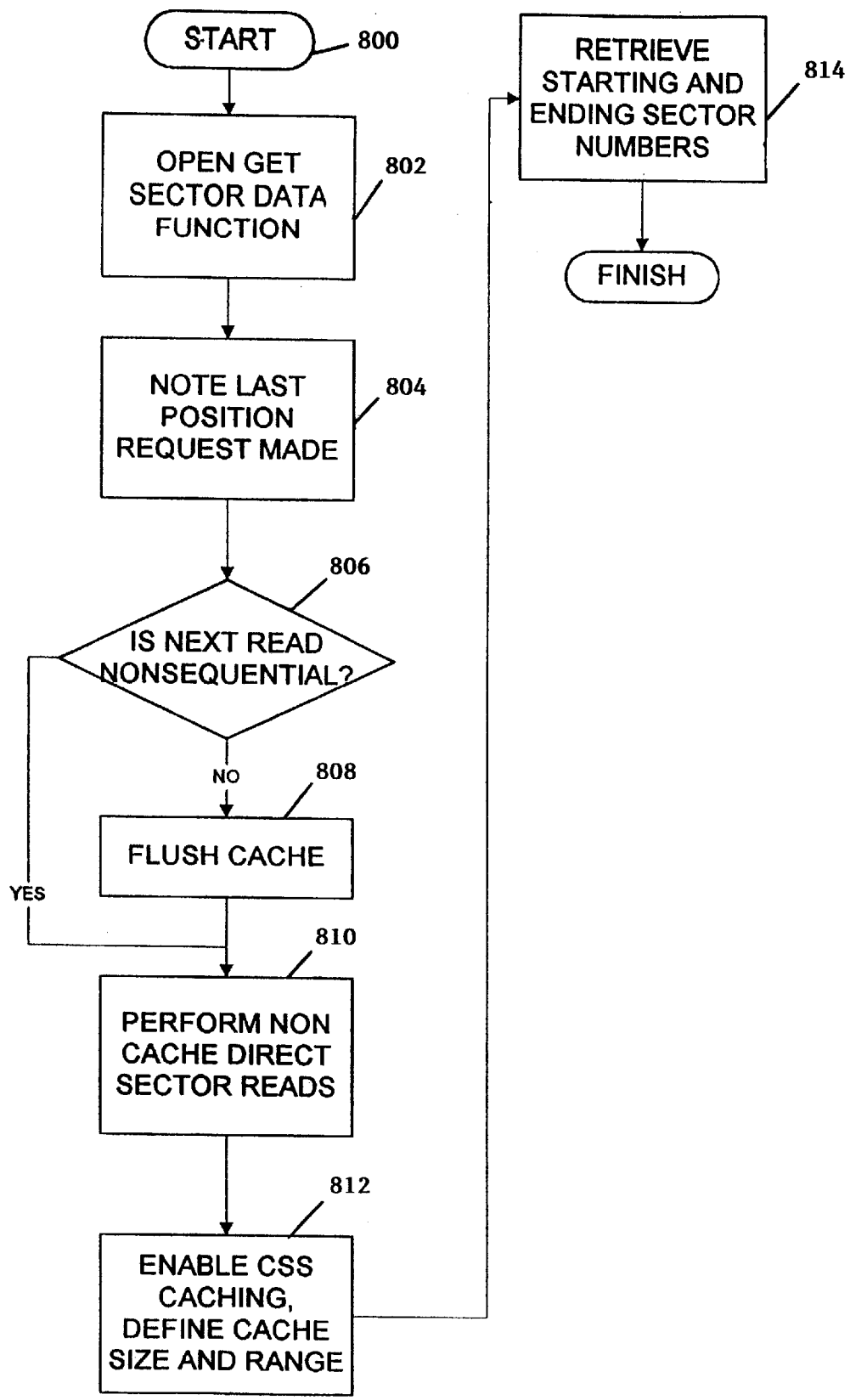
FIG. 8 is a flow diagram illustrating the operation of retrieving data from the cache according to the present invention.

To retrieve data from the cache, the system opens a GetSectorData function in step 802 as shown in the flow diagram of FIG. 8. The system keeps track of the last position request made in step 804. Next, the system determines if the net read is not sequential in step 806 and if not, flushes the cache. The system then can use the direct sector reads with no caching if the cache has not been set up (step 808). The system may also setup the title cache as defined by the starting sector and ending sector. The system does this by setting the cache to enabling CSS caching and defining the CSS cache size and range as shown in step 810. Next, in step 812 the system stores the starting and ending sector numbers of the title before returning for further caching operations. The starting and ending sectors for the titles are obtained from the Video Title Set Information table.

The following pseudo-code is an example of that which may be executed by the Consumer Thread

```
GetSectorData(unsigned long datasize, PBYTE pdata)
{
  Set CacheFilled BOOLEAN to FALSE
  Acquire ThreadSafeMutex semaphore
  while (we haven't filled the cache)
  {
    if (the amount to read is less than the cache size)
    {
      if (there is enough room between the current position and the end
      of the cache)
      {
        Set CacheFilled BOOLEAN to TRUE
        Copy data from the cache to the data buffer
        Advance cache retrieval data pointer
        Decrement the amount of data in the cache
      }
    else
    {
      Copy data from current to ending position of cache to the caller's data
      data buffer decrement the cache size, and the amount to left copy by the
      amount copied to the caller's data buffer
      store the total amount copied
      Store fact that we will starting retrieving data from the cache at
      position 0.
      Set CacheFilled BOOLEAN to TRUE;
      Copy the remaining data from the start of the cache to the caller's data
      buffer
      Advance point to next cache read position
```

-continued

```
    decrement the cache size by the amount of the second copy
    }
}
else the user's request is larger than the total data in the cache
{
    Copy data till the tail of the cache to the caller's buffer
    Reduce the amount to copy by what we just copied
    Decrement the amount of data in the cache
    if (there enough data at the head of the cache)
        {
        Set CacheFilled BOOLEAN to TRUE;
        Copy data from the cache to the data buffer
        Advance cache retrieval data pointer
        Decrement the amount of data in the cache
        }
        else
        {
        Copy the remainder of the cache to the users buffer
        Set cache read pointer to the start of the cache
        Advance cache retrieval data pointer
        Decrement the amount of data in the cache
        Reset Consumer Semaphore
        Release Thread safe Mutex
        Tell producer to wake up and READ some data for use
        Sleep till the cache is full
        }
    }
}//while loop
    Wake Up Producer thread so it can perform read ahead operations
    Release Thread Safe Mutex
}
ReadLogicalSector()
{
    if (Caching is enabled)
    {
    Acquire ThreadSafe Mutex semaphore
    if (we are not reading sequentially OR if this is our firs read)
        {
        BOOL fResetCache;
        if (we've read anything into our cache, see if the request is
        already there)
            {
            fResetCache=SalvageCache(sectornum, numsectors,
pData);
            }
            else
            {
            fResetCache = TRUE;
            }
        if (data can't be found in cache)
            {
            indicate that the last sector we've read is the currently
            requested sector
            Set cache flush flag
            Reset Consumer semaphore;
            Release Threadsafe semaphore
            Wake up producer to fill cache
            Sleep till the cache is full
            }
    }
    else
    {
        Release Threadsafe semaphore
    }
    //get some data from the cache
    GetSectorData();
    Keep track of the last position request
    If the next read isn't sequential, we must flush the cache
    }
    else
        {
        Just use direct sector reads with no caching if the cache isn't set up
        }
}
SetUpTitleCache(startingsector, endingsector)
{
    Set flag enabling CSS caching, CSS cache size and range
    Store starting and ending sector numbers of the title
```

-continued

```
    Note: starting and ending sectors for the title are obtained from the
    Video Title Set Information table.
```

When the system needs to salvage the contents of the cache, the system performs the method according to that illustrated in FIG. 9. Before starting, a few definitions are given. The cachesize variable is used to indicate the amount of data in the cache. Totalcachesize is the maximum cache size. The getpos tag stores the location where the read occurred (this allows us to determine if this sector has previously been read). The m__readpos, also called the cache read position, stores the byte where the producer thread is placing data into the cache. The system begins in step 900 and then proceeds to step 902 where the system sets the NotInCache flag to False. In step 904, the system sets the searchloop and getpos variables to zero. Proceeding to step 906, the system determines whether the search loop is less than the maximum data found in the cache and if so proceeds to step 908; otherwise, the system proceeds to step 924. In step 908, the system determines whether the starting sector is currently available in the array of previous cache reads and, if so, proceeds to step 910; otherwise, the system proceeds to step 922. In step 910, the system sets the NotInCache flag to False and proceeds to step 912. In step 912, the system advances the depth position to the actual correct position and then proceeds to step 914.

In step 914, the system sets the member position variable to the current position variable as previously determined in step 912. Next, in step 916, the system determines if the current position is greater than the read position value. If so, the system proceeds to step 918, otherwise, the system proceeds to step 920. In step 918, the system calculates the cache size is equal to the relationship of the total cache values less the GetPosition value and then adding the Read position value. Once the cache size value is calculated, the system then proceeds to step 922. In step 920, where the current position is less than the read position, the system establishes the cache sizes being equal to the read position less the Get position and then proceeds to step 922. In step 922, the system sets the Get position to the next position in the Read array and then proceeds to step 924 to increment the searchloop by one value in anticipation of performing the next operation. Once the searchloop value has been incremented, then the system returns for further processing. The following is a pseudo-code portion of the salvage cache method.

```
}
BOOL DVDIO::SalvageCache(sectornum, numsectors, Data Pointer (or
pData))
{
    Set fNotInCache BOOLEAN to FALSE;
    Set searchloop and getpos variables to 0;
    while (searchloop < max data in cache)
    {
    check IF the starting sector can be found in our array of previous cache
reads
        Set fNotInCache to FALSE if it is
        Advance getpos to the correct position in the cache;
        Set member variable m__getpos = getpos;
        check if current position (m__getpos ) greater than m__readpos
(read position)
        Set cachesize to (totalcachesize − m__getpos) + m__readpos;
        else
        m__cachesize = m__readpos − m__getpos;
```

```
        exit while loop
      else starting sector NOT in cache reads...
      {
        Set getpos to next position in cache read array.
      }
      increment search loop
    }
    return (fNotInCache);
}// DVDIO::SalvageCache
```

The illustrative embodiment of the present invention has been described with reference to an interactive DVD browser written in accordance with the DVD specification for read-only discs. Similar concepts, however, may be applied to the current specification for CD ROM players and other media players having legacy design which adhere to published standards of specification.

The above-described invention may be implemented in either all software, all hardware, or a combination of hardware and software, including program code-based implementations stored in firmware format to support dedicated hardware. A software application suitable for implementing the invention in is the Interactive DVD Browser (IDB), Version 1.0 and thereafter, commercially available from Oak Technology, Inc., Sunnyvale, Calif.

A software implementation of the above described embodiment(s) may comprise a series of computer instructions either fixed on a tangible medium, such as a computer readable media, e.g. diskette 142, CD-ROM 147, ROM 115, or fixed disc 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted (you may want to give an illustration—i.e. interrupt processing routines). Further, the methods of the invention may be achieved in either all software implementations, using the appropriate object or processor instructions, or in hybrid implementations which utilize a combination of hardware logic, software logic and/or firmware to achieve the same results, the specific configuration of logic and/or instructions utilized to achieve a particular function, as well as other modifications to the inventive concept are intended to be covered by the appended claims.

What is claimed is:

1. A digital versatile disc (DVD) apparatus capable of reading copy-protected data from a source, the source being read as a data stream by a DVD reader in the DVD apparatus, the DVD apparatus comprising:

a cache memory store coupled to the DVD reader;

a producer thread, coupled to the cache memory, to read the DVD copy-protected content and cache it within a title defined during the reading of the data stream;

a consumer thread, coupled to the cache memory and the producer thread, to retrieve the cached content stored in the cache memory.

2. The apparatus according to claim 1 wherein the copy-protected data is Content Scrambling System (CSS) encoded.

3. The apparatus according to claim 1 further comprising a salvage thread, coupled to the consumer thread and the cache memory, to define the position for data retrieval of the cached data as retrieved by the consumer thread.

4. The apparatus according to claim 1 wherein the title is selected from multiple titles stored on the DVD source.

5. The apparatus according to claim 4 wherein the title is stored across a plurality of sectors and the producer thread reads only those sectors associated with the title and ignores non-authorized titles.

6. The apparatus according to claim 1 wherein a title is selected by the producer thread as parsed from the data stream, the title being defined by a start position and ending position, with the producer thread being authorized to cache data read from the data stream only to the ending position.

7. A method for caching data read in a data stream from a DVD player, the data stream containing copy protected content, the method comprising:

parsing the data stream for content information;

selecting a portion of the parsed data stream based on a portion of the content information, the portion of the parsed data stream comprising a title to be played by the DVD player; and upon authorization, caching the title.

8. The method according to claim 7 further comprising:

reading the cached portion of parsed data stream.

9. The method according to claim 7 wherein the parsing step further comprises: defining the title to be cached.

10. The method according to claim 9 wherein the defining step comprises:

determining a start position for the title;

determining an end position for the title; and preventing caching past the title end position.

11. The method according to claim 7 wherein the copy protected content is CSS encoded.

12. The method according to claim 9 wherein the title comprises a plurality of sectors and the preventing caching step comprises: determining the last sector to cache based on the end position.

13. A computer program product for use with a computer system, the computer program product containing computer usable program code embodied thereon for caching data read in a data stream from a DVD player, the data stream containing copy protected content, the program code comprising:

program code for parsing the data stream for content information;

program code for selecting a portion of the parsed data stream based on a portion of the content information, the portion of the parsed data stream comprising a title to be played by the DVD player;

program code for caching the title.

14. The computer program product according to claim 13 further comprising:

program code for reading the cached portion of parsed data stream.

15. The computer program product according to claim 13 wherein the program code for parsing further comprises;

program code for defining the title to be cached.

16. The computer program product according to claim 15 wherein the program code for defining comprises:

program code for determining a start position for the title;

program code for determining an end position for the title; and program code for preventing caching past the title end position.

17. The computer program product according to claim 13 wherein the copy protected content is CSS encoded.

18. The computer program product according to claim 15 wherein the title comprises a plurality of sectors and the program code for preventing caching comprises program code for determining the last sector to cache based on the end position.

* * * * *